United States Patent
Park et al.

(10) Patent No.: US 8,929,743 B2
(45) Date of Patent: Jan. 6, 2015

(54) SCHEME OF REMOTE CONTROL OF THE SLICING LEVEL OF A RECEIVER IN A SMART TRANSCEIVER

(75) Inventors: Kwang Soo Park, Tinton Falls, NJ (US); Moon Soo Park, Gwangju (KR)

(73) Assignee: Optoelectronics Solutions Co., Ltd., Gwangju (KR)

( * ) Notice: Subject to any disclaimer, the term of this patent is extended or adjusted under 35 U.S.C. 154(b) by 500 days.

(21) Appl. No.: 13/208,299

(22) Filed: Aug. 11, 2011

(65) Prior Publication Data

US 2013/0039652 A1 Feb. 14, 2013

(51) Int. Cl.
*H04B 10/40* (2013.01)
*H04B 10/66* (2013.01)
*H04B 10/69* (2013.01)

(52) U.S. Cl.
CPC .............. *H04B 10/40* (2013.01); *H04B 10/695* (2013.01)
USPC ............................ 398/137; 398/162; 398/209

(58) Field of Classification Search
CPC .............................. H04B 10/695; H04B 10/40
USPC .......................................... 398/137, 162, 209
See application file for complete search history.

(56) References Cited

U.S. PATENT DOCUMENTS

2009/0269053 A1* 10/2009 Yang ................................. 398/22
2009/0269076 A1* 10/2009 Cai et al. ......................... 398/135
2011/0191632 A1 8/2011 Miller

OTHER PUBLICATIONS

OE Solutions demonstrates 10GbE single-wavelength bi-directional XFP; Lightwave, Mar. 4, 2011 [online], [retrieved on Dec. 7, 2013]. Retrieved from the Internet <URL: http://www.lightwaveonline.com/articles/2011/03/oe-solutions-demonstrates-10gbe-single-wavelength-bi-directional-xfp-117399913.html.*
Wikipedia, "Proprietary protocol," http://web.archive.org/web/20090730020423/http://en.wikipedia.org/wiki/Proprietary_protocol, prior to Jul. 30, 2009; 2 pages.
Non-Final Office Action dated Dec. 19, 2013 from U.S. Appl. No. 13/208,301.

* cited by examiner

*Primary Examiner* — Nathan Curs
(74) *Attorney, Agent, or Firm* — Blakely, Sokoloff, Taylor & Zafman LLP

(57) ABSTRACT

A scheme is described of remote control of the slicing level of a receiver in a smart SFP (or SFP+, or XFP) duplex (or BiDi, or SWBiDi) transceiver in a communication system using an operating system with OAM and PP functions, an OAM, PP & Payload Processor, a transceiver, a BERT, and an optical link in the field.

21 Claims, 3 Drawing Sheets

Configuration for a Scheme of Remote Control of Slicing Level of a Receiver in a Smart Transceiver Figure 1. Configuration for a Scheme of Remote Control of Slicing Level of a Receiver in a Smart Transceiver Figure 2. Block Diagram of a Smart Transceiver

SCHEME OF REMOTE CONTROL OF THE SLICING LEVEL OF A RECEIVER IN A SMART TRANSCEIVER

FIELD

Embodiments of the invention relate to a scheme of remote control of electro-optical parameters of a smart transceiver in an optical fiber communication system, and more particularly, a scheme of remote control of the slicing level or decision threshold of a receiver in the smart transceiver. The applications of embodiments of the present invention include a smart transceiver installed in communication systems without optical amplifiers as well as optically amplified systems, for example, such as long-haul transmission networks, access networks of fiber to the x (FTTx), passive optical network (PON) networks, and wireless backhauls between a base station and an antenna tower or a remote radio head (RRH), but not limited only to these systems. A smart transceiver is an intelligent transceiver that can execute Ethernet in the First Mile Operation, Administration, and Maintenance (EFM OAM) functions specified in IEEE 802.3ah, including an electrical loopback configuration. The type of the smart transceiver includes a smart small form-factor pluggable (SFP) transceiver, a smart small form-factor pluggable plus (SFP+) transceiver, and a smart 10 gigabit small form-factor pluggable (XFP) transceiver, and a Duplex smart transceiver as well as a birdirectional (BiDi) smart transceiver and a single wavelength bidirectional (SWBiDi) smart transceiver.

BACKGROUND

Setting the slicing level or decision threshold level of a receiver in a transceiver at an optimum level is very desirable since a slight offset from the optimum level will degrade significantly the bit error rate (BER) performance of a communication system. The optimum slicing level depends solely on each system in which the transceiver is operating. Here all the communication systems are grouped in three as follows: 1) communication systems without optical amplifiers, 2) optically amplified communication systems, and 3) communication systems using single-wavelength-bidirectional transceivers (SWBiDi).

For the communication systems without optical amplifiers, it is a common practice to use, on a printed circuit board (PCB) of the transceiver without any adjustment, a decision circuit such as a limiting amplifier (LA) whose slicing level is preset (default) in its IC design; the amount of offset from the optimum level is within its IC specification limits though. Considering the cost involved in optimizing the slicing level for the optimum BER performance, a further optimization of the slicing level from the default might not be attractive. As a penalty due to the non-optimum slicing level, these systems must allocate some extra margins in their system link budget where even extra 1 dB of link budget is quite often costly.

For the optically amplified systems, it is well known that the optimum slicing level is shifted from the default level toward the "0" rail due to the beat noises such as signal-amplified spontaneous emission (ASE) beat noise and ASE-ASE beat noises when the optical signal to noise ratio (OSNR) is poor. The amount of shift can be determined only after the BER in the real system is measured at various slicing levels.

For the communication systems using single-wavelength-bidirectional transceivers, it is also known that the optimum slicing level is shifted from the default level toward the "0" rail due to the interferometric beat noise (IBN) when there is reflections along the transmission path. The amount of shift can be determined only after the BER in the real system is measured at various slicing levels.

The transceiver in the optically amplified systems or in the communication systems using SWBiDi requires the adjustability of the slicing level of a receiver in the transceiver because a slight offset of the slicing level from the optimum level might be detrimental for the BER performance of the receiver, effectively making the communication systems unusable. Because a communication system consists of, at least, two transceivers and the receiver of one transceiver is receiving a signal from the transmitter of another transceiver, the controllability of the slicing level of the receiver in one transceiver by another transceiver will be a desirable feature. This is particularly true if two transceivers are physically separated far away from each other. In other words, a remote controllability of the slicing level of one transceiver by another transceiver will be very valuable, considering the facts that 1) the adjustment of its slicing level can be executed by the technician at the central office (CO) where all the necessary test equipments are accessible easily and 2) another technician does not have to be present simultaneously at the site of the transceiver which is in need of adjustment of its slicing level; this will save a lot of capital and operating expenditures (CAPEX and OPEX) by the service provider/operator.

SUMMARY

According to embodiments of the present inventions, a scheme of remote control of the slicing level or decision threshold level of a receiver in a smart transceiver may comprise a smart transceiver at a first end of the optical link, the optical link, a transceiver, an OAM, PP & Payload processor, an operating system with OAM and proprietary protocol (PP) functions, and a Bit Error Rate Test (BERT) equipment at a second end of the optical link. A PP similar to operational, administration, and maintenance protocol data unit (OAMPDU) of EFM OAM is a message protocol of changing the slicing level of a receiver in the smart transceiver.

According to embodiments of the present invention, a smart transceiver at a first end of the optical link can perform the EFM OAM in passive mode defined in IEEE802.3ah including the electrical loopback. The smart transceiver is equipped with circuitry that can adjust the slicing level of the receiver upon receiving a commanding message in a proprietary protocol from the transceiver at a second end of the optical link. The type of the smart transceiver may be SFP, or SFP+, or XFP, and Duplex, or BiDi, or SWBiDi.

According to embodiments of the present invention, an optical link may comprise an optical MUX, optical amplifier (s), optical fiber(s), and an optical demultiplexer (DEMUX).

According to embodiments of the present invention, a transceiver at a second end of the optical link can perform the EFM OAM in active mode defined in IEEE802.3ah. This transceiver can send out a commanding message of the adjustment of the slicing level of the receiver in the smart transceiver in a first end of the optical link using a PP.

BRIEF DESCRIPTION OF THE DRAWINGS

Embodiments of the present invention are illustrated by way of example and not limitation in the figures of the accompanying drawings, in which like references indicate similar elements.

DETAILED DESCRIPTION

Figure 1:
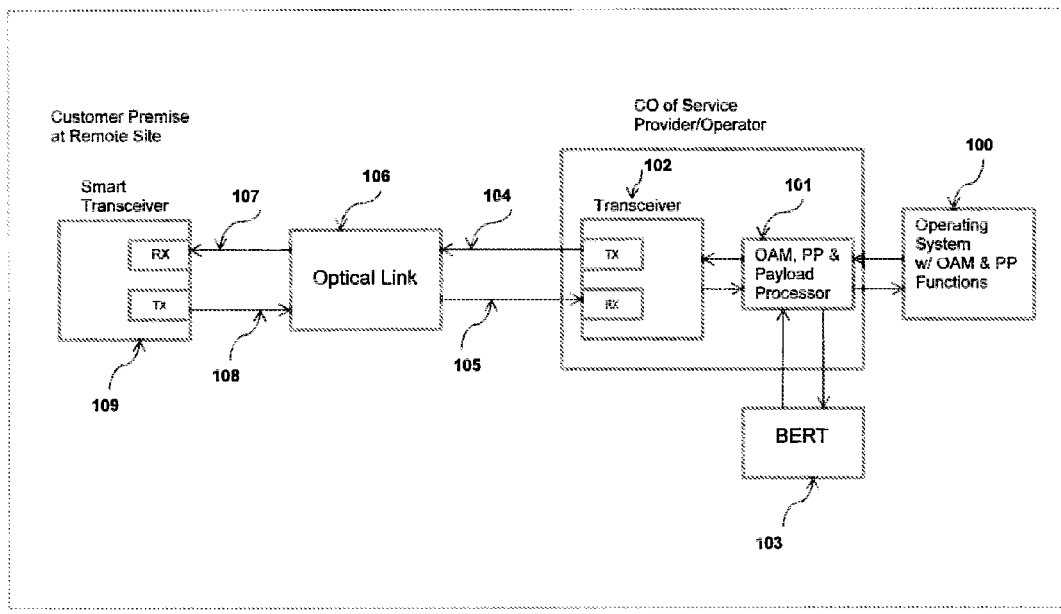
FIG. 1 shows a configuration for a scheme of remote control of slicing level of a receiver in a smart duplex transceiver.

As shown in FIG. 1, a scheme of remote control of the slicing level of a receiver in a smart transceiver includes an operating system with OAM and PP functions 100, an OAM, PP & Payload Processor 101, a duplex transceiver 102, a BERT 103, a pair of optical fiber jumpers 104 and 105, an optical link 106, a pair of optical fiber jumpers 107 and 108, and a smart duplex transceiver 109.

Figure 2:
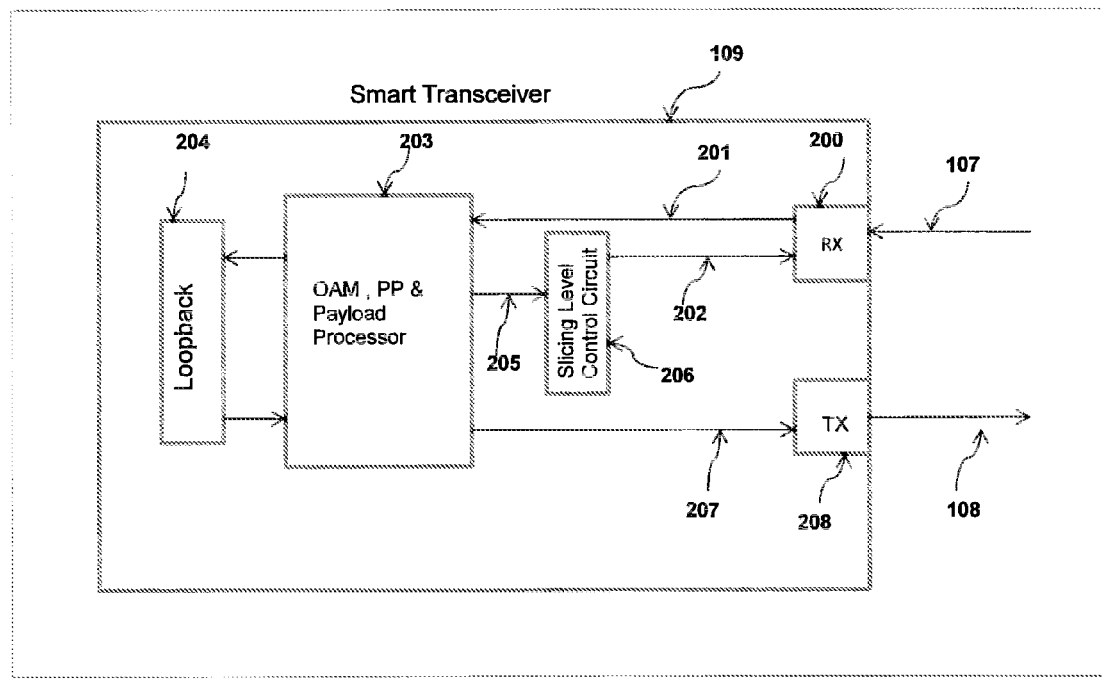
FIG. 2 shows a detail functional block diagram of a smart duplex transceiver.

As shown in FIG. 2, a smart duplex transceiver includes an optical receiver 200, electrical paths 201 and 202, an OAM, PP & Payload Processor 203, a loopback switch 204, an electrical path 205, a slicing level control circuit 206, an electrical path 207, and an optical transmitter 208.

It is assumed that the transmissions are error free in either direction, from the transceiver 102 to the smart transceiver 109, or from the smart transceiver 109 to the transceiver 102. This assumption is valid because almost all the systems in service are running in the error free region.

If, however, the transmission of a loopbacked signal starting from the transceiver 102 to the smart transceiver 109 to the transceiver 102 is not error free, first optimize the slicing level of the transceiver 102 to read the best BER. Then follow the procedures below.

Also a variable optical attenuator might be needed in between the output of the transmitter in the transceiver 102 and the optical jumper 104 if there is an allocated, big system margin, since the measured BER in the procedures below needs to be measurable with some errors in the finite measurement time period.

Figure 3:
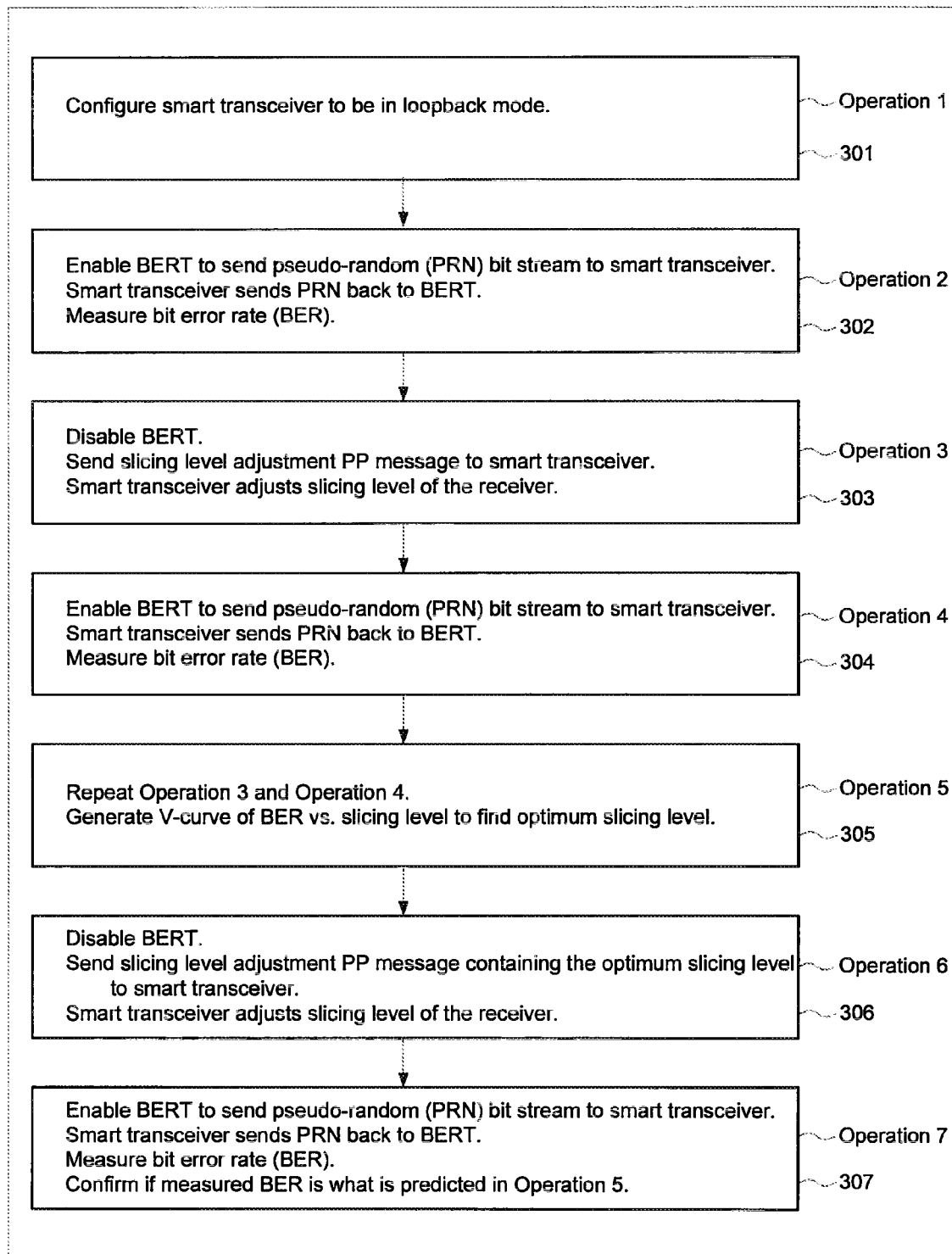
FIG. 3 shows a procedure for the remote control of the slicing level of a receiver in a smart duplex transceiver.

The following is a procedure, shown in FIG. 3, for the remote control of the slicing level of a receiver in a smart duplex transceiver 109.

Operation One

The following is the first operation 301. It is necessary, first of all, to configure the smart duplex transceiver 109 in a loopback mode. For this, a loopback OAM Protocol Data Unit (OAMPDU) generated at the operating system with OAM and PP functions 100 is sent to an OAM, PP & Payload Processor 101 where the loopback OAMPDU is encapsulated serially with the payload, if there is any. During this period, disable the output from the BERT 103. The output is sent to the transceiver 102 where the electrical signal of the loopback OAMPDU message is converted into an optical signal. Then the optical signal of the loopback message is transmitted through the optical jumper 104, the optical link 106, an optical jumper 107, and arrives at the smart diplex transceiver 109.

The optical signal arrived at the smart duplex transceiver 109 is then converted into an electrical signal at the receiver 200. The electrical signal is transmitted through the electrical path 201, and arrives at an OAM, PP & Payload Processor 203 where the loopback OAMPDU message is separated and executed. Now only the remaining payload, if there is any, passes through the OAM, PP & Payload Processor 203, an electrical path 207, and arrives at the optical transmitter 208 where the electrical payload signal is converted into an optical signal.

The optical signal of the payload from the smart transceiver 109 is transmitted through an optical jumper 108, the optical link 106, an optical jumper 105, and arrives at the transceiver 102 where the optical signal is converted into an electrical signal. The electrical signal transmits to the OAM, PP & Payload Processor 101. This completes the configuration in the loopback mode.

Operation Two

The following is the second operation 302. Enable the output from the BERT 103 and a pseudo-random bit stream is sent out at the same data rate of the communication system to the OAM, PP & Payload Processor 101. During this transmission period, do not send out any OAMPDU's and PP's in the data stream. This pseudo-random data signal will be transmitted through the path described above during the preparation of the loopback mode and then will return to the error detector of the BERT for the BER measurement. Record the measured BER.

Operation Three

The following is the third operation 303. Disable the output of the BERT 103. Send a slicing level adjustment PP message generated at the operating system with OAM and PP functions 100 to the OAM, PP & Payload Processor 101. The output is sent to the transceiver 102 where the electrical signal of the slicing level adjustment PP message is converted into an optical signal. Then the optical signal of the slicing level adjustment PP message is transmitted through the optical jumper 104, the optical link 106, an optical jumper 107, and arrives at the smart diplex transceiver 109.

The optical signal arrived at the smart duplex transceiver 109 is then converted into an electrical signal at the receiver 200. The electrical signal is transmitted through the electrical path 201, and arrives at an OAM, PP & Payload Processor 203 where the slicing level adjustment PP message is separated. An execution message of the slicing level adjustment is sent to the slicing level control circuit 206 which adjusts the slicing level the receiver 201 accordingly.

Operation Four

The following is the fourth operation 304. Enable the output from the BERT 103 and a pseudo-random bit stream is sent out at the same data rate of the communication system to the OAM, PP & Payload Processor 101. During this transmission period, do not send out any OAMPDU's and PP's in the data stream. This pseudo-random data signal will be transmitted through the path described operation (1) above during the preparation of the loopback mode and then will return to the error detector of the BERT for the BER measurement. Record the measured BER.

Operation Five

The following is the fifth operation 305. Repeat operations (3) and (4) above at a few different slicing levels and generate a V-curve of BER vs slicing level to find the optimum slicing level.

Operation Six

The following is the sixth operation 306. Repeat operation (3) above with the optimum slicing level found in operation (5) above.

Operation Seven

The following is the seventh operation 307. Repeat operation (4) above and confirm if the measured BER is indeed what is predicted in operation (5) above.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for optimizing a communication system comprising:

remote control of slicing level of a receiver in a first transceiver in the communication system, said communication system further comprising an operating system with Operation, Administration, and Maintenance (OAM) and Protocol functions, an OAM, Protocol & Payload Processor, a second transceiver, Bit Error Rate Test (BERT) equipment, and an optical link, wherein remote control of slicing level of the receiver in the first transceiver comprises:

a first operation comprising configuring the first transceiver to be in a loopback mode;

a second operation comprising enabling the BERT equipment to transmit a pseudo-random (PRN) bit stream to the first transceiver, the first transceiver transmitting the PRN back to the BERT for bit error rate (BER) measurement, and recording of the measured BER;

a third operation comprising the second transceiver transmitting a slicing level adjustment Protocol message to the first transceiver, and the first transceiver adjusting its slicing level according to the slicing level adjustment Protocol message;

a fourth operation comprising enabling the BERT equipment to transmit a pseudo-random (PRN) bit stream to the first transceiver, the first transceiver transmitting the PRN back to the BERT for measuring the BER;

a fifth operation comprising repeating the third and fourth operations until an optimum slicing level based on the measured BER recordings is found; and a sixth operation comprising transmitting a slicing level adjustment Protocol messaging containing the optimum slicing level to the first transceiver, and the first transceiver adjusting its slicing level based on the optimum slicing level.

2. The method of claim 1, wherein the first transceiver comprises a duplex small form-factor pluggable (SFP) transceiver.

3. The method of claim 1, wherein the first transceiver comprises a bidirectional small form-factor pluggable (BiDi SFP) transceiver.

4. The method of claim 1, wherein the first transceiver comprises a single wavelength bidirectional small form-factor pluggable (SWBiDi SFP) transceiver.

5. The method of claim 1, wherein the first transceiver comprises a duplex small form-factor pluggable plus (SFP+) transceiver.

6. The method of claim 1, wherein the first transceiver comprises a bidirectional small form-factor pluggable plus (BiDi SFP+) transceiver.

7. The method of claim 1, wherein the first transceiver comprises a single wavelength bidirectional small form-factor pluggable plus (SWBiDi SFP+) transceiver.

8. The method of claim 1, wherein the first transceiver comprises a duplex 10 gigabit small form-factor pluggable (XFP) transceiver.

9. The method of claim 1, wherein the first transceiver comprises a bidirectional 10 gigabit small form-factor pluggable (BiDi XFP) transceiver.

10. The method of claim 1, wherein the first transceiver comprises a single wavelength bidirectional 10 gigabit small form-factor pluggable (SWBiDi XFP) transceiver.

11. The method of claim 1, wherein the optical link comprises an optical link without optical amplifiers.

12. The method of claim 1, wherein the optical link comprises an optically amplified optical link.

13. The method of claim 1, wherein the OAM, Protocol & Payload Processor comprises an application specific integrated circuit (ASIC).

14. The method of claim 1, wherein the OAM, Protocol & Payload Processor comprises an integration of a plurality of integrated circuits.

15. The method of claim 14, wherein the integration of the plurality of integrated circuits comprises of a micro-controller.

16. The method of claim 14, wherein the integration of the plurality of integrated circuits comprises of a field programmable gate array (FPGA).

17. The method of claim 14, wherein the integration of the plurality of integrated circuits comprises of a micro-controller and a field programmable gate array (FPGA).

18. The method of claim 1, wherein the BERT equipment measures the Bit Error Rate (BER) of a signal.

19. A method for optimizing a communication system comprising:

remote control of slicing level of a receiver in a first transceiver in the communication system, said communication system further comprising an operating system with Operation, Administration, and Maintenance (OAM) and Protocol functions, an OAM, Protocol & Payload Processor, a built-in-system-test (BIST) procedure executed by the OAM, Protocol & Payload processor, a second transceiver, and an optical link, wherein remote control of slicing level of the receiver in the first transceiver comprises:

a first operation comprising configuring the first transceiver to be in a loopback mode;

a second operation comprising enabling the built-in-system-test (BIST) procedure to transmit a pseudo-random (PRN) bit stream or a framed bit stream to the first transceiver, the first transceiver transmitting the PRN bit stream or the framed bit stream back for bit error rate (BER) measurement, and recording the measured BER;

a third operation comprising the second transceiver transmitting a slicing level adjustment Protocol message to the first transceiver, and the first transceiver adjusting its slicing level according to the slicing level adjustment Protocol message;

a fourth operation comprising enabling the built-in-system-test (BIST) procedure to transmit a pseudo-random (PRN) bit stream or a framed bit stream to the first transceiver, the first transceiver transmitting the PRN bit stream or the framed bit stream back for measuring the BER;

a fifth operation comprising repeating the third and fourth operations until an optimum slicing level based on the measured BER recordings is found; and a sixth operation comprising transmitting a slicing level adjustment Protocol messaging containing the optimum slicing level to the first transceiver, and the first transceiver adjusting its slicing level based on the optimum slicing level.

20. The method of claim 19, wherein the OAM, Protocol & Payload Processor comprises an application specific integrated circuit (ASIC).

21. The method of claim 19, wherein the OAM, Protocol & Payload Processor comprises an integration of a plurality of integrated circuits.

* * * * *